United States Patent
Lee

(10) Patent No.: US 8,599,273 B2
(45) Date of Patent: Dec. 3, 2013

(54) HANDSHAKE CORRECTION APPARATUS OF PHOTOGRAPHING APPARATUS

(75) Inventor: Seung-hwan Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 370 days.

(21) Appl. No.: 12/710,495

(22) Filed: Feb. 23, 2010

(65) Prior Publication Data

US 2010/0238307 A1      Sep. 23, 2010

(30) Foreign Application Priority Data

Mar. 17, 2009   (KR) .................. 10-2009-0022759

(51) Int. Cl.
*H04N 5/228*   (2006.01)

(52) U.S. Cl.
USPC .................... 348/208.4; 348/208.2

(58) Field of Classification Search
USPC .............. 348/208.7, 208.5, 208.1, 208.13, 348/208.16, 352; 396/55
See application file for complete search history.

(56) References Cited

U.S. PATENT DOCUMENTS 5,144,353 A * 9/1992 Odaka et al. ............. 396/133
6,112,028 A   8/2000 Okada 2007/0139528 A1 * 6/2007 Chang ..................... 348/208.11
2008/0055421 A1 * 3/2008 Kimura .................... 348/208.99
2008/0187301 A1 * 8/2008 Takahashi ..................... 396/55

OTHER PUBLICATIONS

Office Action established for CN 201010134426.8 (Sep. 4, 2013).

* cited by examiner

*Primary Examiner* — Roberto Velez
*Assistant Examiner* — Stephen Coleman
(74) *Attorney, Agent, or Firm* — Drinker Biddle & Reath LLP

(57) ABSTRACT

Disclosed is a handshake correction apparatus of a photographing apparatus. The handshake correction apparatus includes a lens support plate that supports a correction lens and operates in a direction perpendicular to an optical axis; a base that supports the lens support plate to be movable; and magnets and driving coils which are assembled on the lens support plate and the base to face each other, wherein the magnets are tight-fitted in assembly grooves of the lens support plate or the base, and wherein one or more protrusions that protrude from internal walls of the assembly grooves toward the magnets and elastically press the magnets are formed in the assembly grooves. Control performance of a correction operation of the handshake correction apparatus may be improved by ensuring alignment between assembly structures of assembly parts including magnets and yokes.

18 Claims, 8 Drawing Sheets

HANDSHAKE CORRECTION APPARATUS OF PHOTOGRAPHING APPARATUS

CROSS-REFERENCE TO RELATED PATENT APPLICATION

This application claims the benefit of Korean Patent Application No. 10-2009-0022759, filed on Mar. 17, 2009, in the Korean Intellectual Property Office, the disclosure of which is incorporated herein in its entirety by reference.

BACKGROUND

The present invention relates to a handshake correction apparatus of a photographing apparatus, and more particularly, to a handshake correction apparatus capable of correcting image blur caused by the hand of a user shaking.

Digital cameras capture an image of a subject, convert the image into image data, and record the image data in an appropriate file format. If the captured image is affected by the hand of a user shaking or external vibration, the captured image may be blurred, thereby having low quality.

Currently, various image stabilization techniques for automatically correcting camera shake have been developed. For example, a method of fixing an image-forming location on an image sensor by driving and controlling an optical lens to move by an appropriate amount corresponding to camera shake has been considered. In this case, a voice coil motor (VCM) actuator operating based on electromagnetic interaction between magnets and driving coils may be used to drive the optical lens. However, if misalignment occurs between the magnets and the driving coils or between the magnets and yokes, control performance of a correction operation is decreased.

SUMMARY

The present invention provides a handshake correction apparatus capable of improving control performance of a correction operation by ensuring alignment between assembly parts including magnets and yokes.

According to an aspect of the present invention, there is provided a handshake correction apparatus including a lens support plate that supports a correction lens and operates in a direction perpendicular to an optical axis; a base that supports the lens support plate to be movable; and magnets and driving coils which are assembled on the lens support plate and the base to face each other, wherein the magnets are tight-fitted in assembly grooves of the lens support plate or the base, and wherein one or more protrusions that protrude from internal walls of the assembly grooves toward the magnets and elastically press the magnets are formed in the assembly grooves.

The internal walls of the assembly grooves, which face the one or more protrusions, may function as flat reference surfaces.

The one or more protrusions may be formed on the internal walls that face the magnets in different directions.

The assembly grooves may have a rectangular shape defined by two horizontal walls and two vertical walls, which are separately parallel to each other, the one or more protrusions may be formed on one of the horizontal walls and one of the vertical walls, and the other one of the horizontal walls and the other one of the vertical walls may function as flat reference surfaces.

The one or more protrusions may be formed on all of the internal walls of the assembly grooves, which surround the magnets.

The one or more protrusions may include one or more first protrusions that are relatively easy to be elastically deformed; and one or more second protrusions that are relatively difficult to be elastically deformed. In this case, the one or more first protrusions may be formed to have a hollow shape.

The one or more protrusions may include one or more first protrusions that have a relatively small protruding thickness toward the magnets; and one or more second protrusions that have a relatively large protruding thickness toward the magnets.

The one or more protrusions may be integrally formed with the internal walls of the assembly grooves. Alternatively, the one or more protrusions may include elastic members interposed between the magnets and the internal walls of the assembly grooves.

According to another aspect of the present invention, there is provided a handshake correction apparatus including a lens support plate that supports a correction lens and operates in a direction perpendicular to an optical axis; a base that supports the lens support plate to be movable; magnets and yokes which are assembled on the lens support plate and the base to face each other, and driving coils that are interposed between the magnets and the yokes, wherein the yokes are tight-fitted in assembly grooves of the lens support plate or the base, and wherein one or more protrusions that protrude from internal walls of the assembly grooves toward the yokes and elastically press the yokes are formed in the assembly grooves.

The internal walls of the assembly grooves, which face the one or more protrusions, may function as flat reference surfaces.

The one or more protrusions may be formed on the internal walls that face the yokes in different directions.

The assembly grooves may have a rectangular shape defined by two horizontal walls and two vertical walls, which are separately parallel to each other, the one or more protrusions may be formed on one of the horizontal walls and one of the vertical walls, and the other one of the horizontal walls and the other one of the vertical walls may function as flat reference surfaces.

The one or more protrusions may be formed on all of the internal walls of the assembly grooves, which surround the yokes.

The one or more protrusions may include one or more first protrusions that are relatively easy to be elastically deformed; and one or more second protrusions that are relatively difficult to be elastically deformed. In this case, the one or more first protrusions may be formed to have a hollow shape.

The one or more protrusions may include one or more first protrusions that have a relatively small protruding thickness toward the yokes; and one or more second protrusions that have a relatively large protruding thickness toward the yokes.

The one or more protrusions may be integrally formed with the internal walls of the assembly grooves. Alternatively, the one or more protrusions may include elastic members interposed between the yokes and the internal walls of the assembly grooves.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

Hereinafter, the present invention will be described in detail by explaining embodiments of the invention with reference to the attached drawings.

Figure 1:
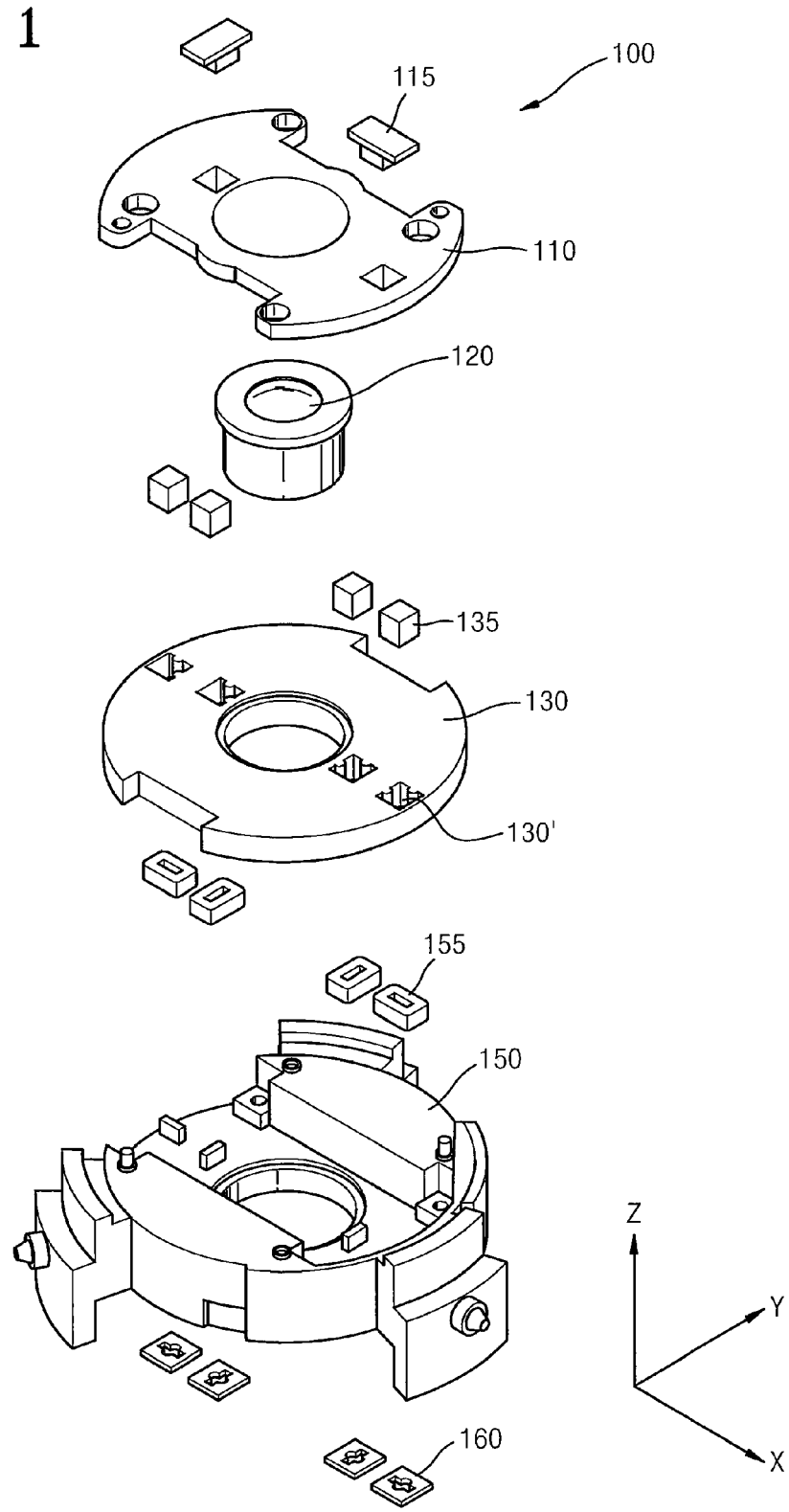
FIG. 1 is an exploded perspective view of a handshake correction apparatus according to an embodiment of the present invention.
Figure 2:
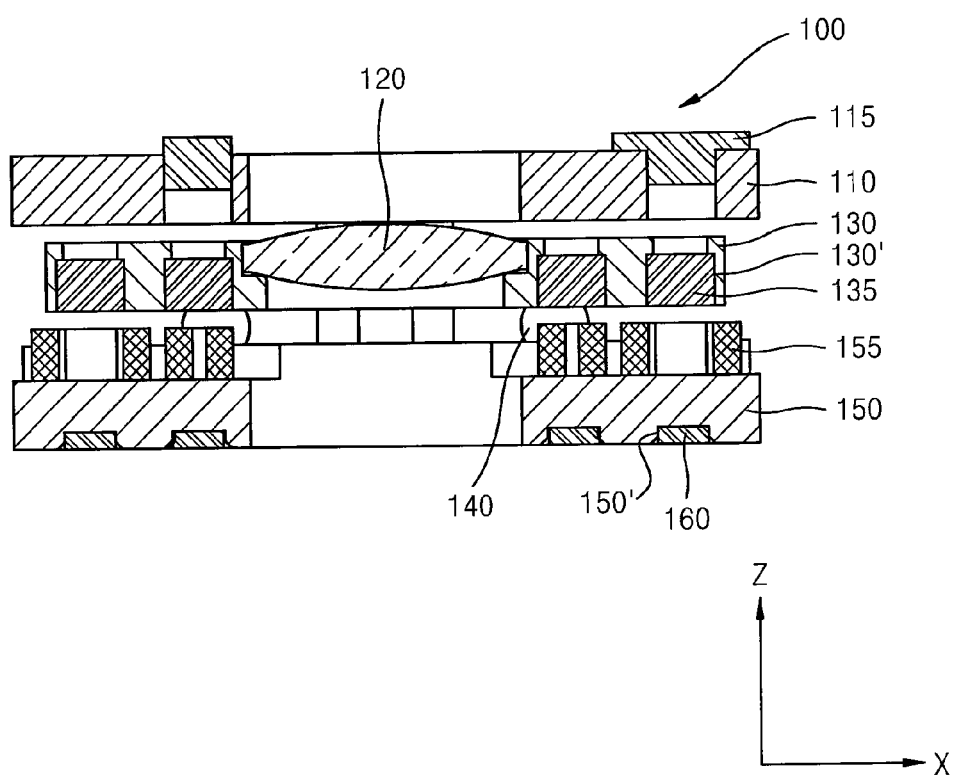
FIG. 2 is an assembled cross-sectional view of the handshake correction apparatus illustrated in FIG. 1.

FIG. 1 is an exploded perspective view of a handshake correction apparatus 100 according to an embodiment of the present invention. FIG. 2 is an assembled cross-sectional view of the handshake correction apparatus 100 illustrated in FIG. 1.

Referring to FIGS. 1 and 2, the handshake correction apparatus 100 includes a correction lens 120, a lens support plate 130 on which the correction lens 120 is mounted, and a base 150 for supporting the lens support plate 130.

Magnets 135 are assembled at both sides (left/right sides) of the lens support plate 130, and driving coils 155 and yokes 160 are assembled in a vertical direction of the base 150 so as to face the magnets 135. For example, the driving coils 155 and the yokes 160 may be respectively assembled on upper and lower surfaces of the base 150 so as to face the magnets 135.

The magnets 135 and the driving coils 155 are located to face each other and form, for example, a voice coil motor (VCM) actuator operating based on electromagnetic interaction. Both ends of the driving coils 155 may be connected to a circuit substrate (not shown) that applies a controlled driving voltage. The lens support plate 130 is driven in an X-Y plane that is perpendicular to an optical axis (Z axis), based on the electromagnetic interaction between the magnets 135 and the driving coils 155 and performs a correction operation.

In order to achieve stable control performance, the magnets 135 and the driving coils 155 should be aligned so that their centers correspond to each other. In this case, a horizontally symmetric driving force with respect to center positions of the magnets 135, without being biased toward any side of the correction lens 120, is obtained, thereby maintaining a linear driving input/output correlation. For example, if a misalignment occurs between the magnets 135 and the driving coils 155, the driving force is horizontally biased toward one side of the correction lens 120, an undesirable rotation component is created in addition to the driving force in X and Y axis directions, and left and right sides of the correction lens 120 have different correction performances. Such a defective correction operation causes image blur. The magnets 135 are assembled to be fitted in assembly grooves 130' formed in the lens support plate 130. As the magnets 135 are tight-fitted in the assembly grooves 130' so as to maintain the alignment with the driving coils 155, an arbitrary dislocation may be prevented and the alignment may be maintained with high precision within several micrometers, which will be described in detail later.

The magnets 135 and the yokes 160 are assembled to face each other and thus apply a magnetic attractive force to each other. The lens support plate 130 closely approaches the base 150 due to the magnetic attractive force between the magnets 135 and the yokes 160, and returns to its equilibrium position when the driving power is cut-off, by aligning centers of the magnets 135 with the centers of the yokes 160.

The yokes 160 are required to maintain their positions with high precision because an equilibrium position of the correction lens 120 is determined based on the positions of the yokes 160. The yokes 160 are assembled to be fitted in assembly grooves 150' (see FIG. 2) formed in the base 150. As the yokes 160 are tight-fitted in the assembly grooves 150', an arbitrary dislocation may be prevented and a position may be maintained with high precision, which will be described in detail later. Meanwhile, the lens support plate 130 and the base 150 are disposed to face each other with ball bearings 140 (see FIG. 2) interposed therebetween. The base 150 supports motion of the lens support plate 130 on the X-Y plane through the ball bearings 140.

A cover 110 may be disposed on the correction lens 120. The cover 110 is assembled on the base 150 with the lens support plate 130 interposed therebetween. A Hall sensor 115 for detecting the position of the correction lens 120 is assembled in the cover 110. The Hall sensor 115 may detect displacement of the correction lens 120 that integrally moves with the magnets 135, by sensing a change in a magnetic field of the magnets 135.

Figure 3:
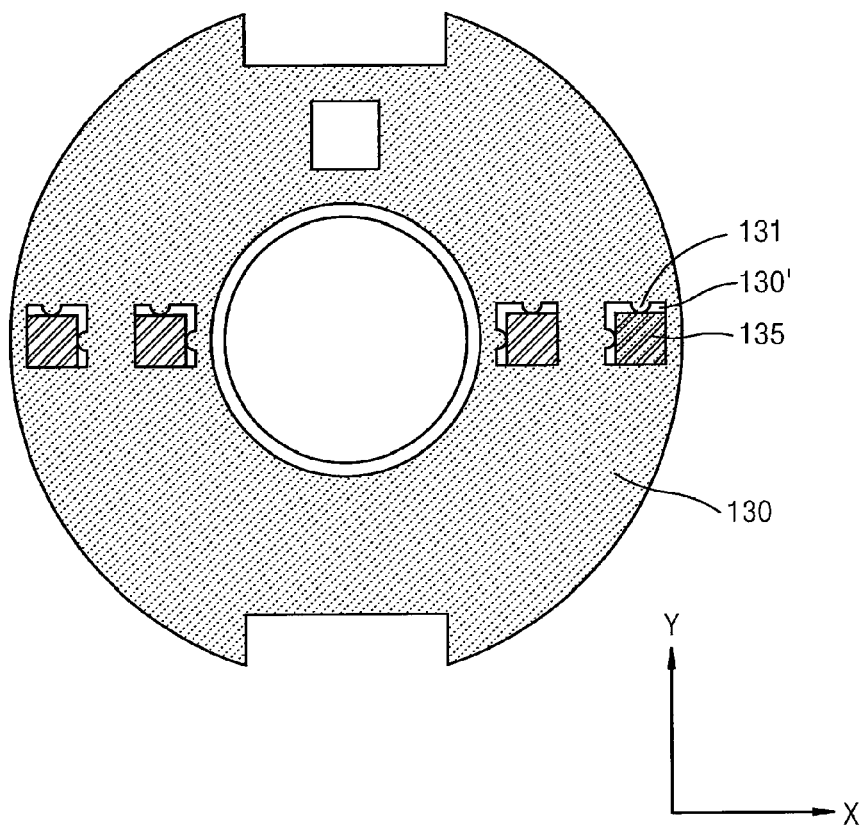
FIG. 3 is a plan view of a lens support plate illustrated in FIG. 1, to which magnets illustrated in FIG. 1 are assembled.

FIG. 3 is a plan view of the lens support plate 130 illustrated in FIG. 1, to which the magnets 135 illustrated in FIG. 1 are assembled.

Referring to FIG. 3, assembly grooves 130' into which the magnets 135 are fitted are formed in the lens support plate 130, and one or more protrusions 131 that protrude toward the magnets 135 are formed in each of the assembly grooves 130'. The magnets 135 are assembled into the assembly grooves 130' by using a tight fit method, are elastically pressed by the protrusions 131, and thus are firmly fixed in the assembly grooves 130'.

Figure 4:
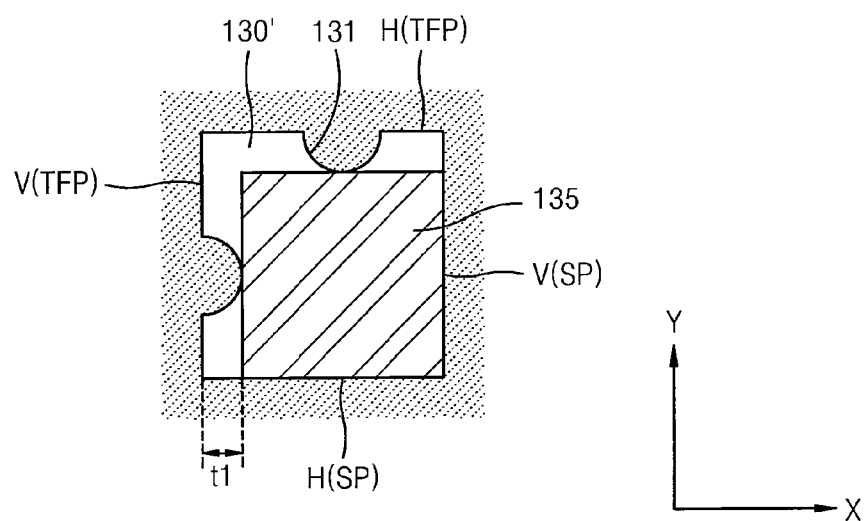
FIG. 4 is a plan view of an assembly groove for a magnet, according to an embodiment of the present invention.

FIG. 4 is a plan view of an assembly groove 130' for a magnet 135, according to an embodiment of the present invention.

Referring to FIG. 4, the assembly groove 130' may be defined by four internal walls including two horizontal walls H and two vertical walls V, which accommodate and fix the magnet 135, and the two horizontal walls H and the two vertical walls V are separately parallel to each other in a rectangular shape. As the magnet 135 is tight-fitted in the assembly groove 130', a movement of the magnet 135 in the assembly groove 130' is suppressed and the position of the magnet 135, which is determined by the assembly groove 130', is maintained.

The assembly groove 130' includes protrusions 131 that protrude from the internal walls toward the magnet 135 and elastically press the magnet 135. As illustrated in FIG. 4, one of the horizontal walls H and one of the vertical walls V function as tight fit surfaces TFPs on which the protrusions 131 are formed and the other one of the horizontal walls H and the one of the vertical walls V function as flat reference assembly surfaces SPs. The two reference assembly surfaces SPs stably support two entire surfaces of the magnet 135 in the X and Y axis directions and thus the magnet 135 may be firmly fixed on a two-dimensional X-Y plane. The protrusions 131 formed on the tight fit surfaces TFPs face the reference assembly surfaces SPs and provide an elastic pressure to make the magnet 135 closely contact the reference assembly surfaces SPs in the X and Y axis directions.

The reference assembly surfaces SPs closely contact the two entire surfaces of the magnet 135 and determine the position and orientation of the magnet 135. In more detail, the magnet 135 is pressed to closely contact the reference assembly surfaces SPs and thus is fixed to the position and orientation for contacting the reference assembly surfaces SPs.

One or more protrusions 131 that protrude toward the magnet 135 may be formed on each of the tight fit surfaces TFPs so as to press the magnet 135 to closely contact the reference assembly surfaces SPs. When the magnet 135 is assembled, the protrusions 131 are compressed and press in an elastically biased state the magnet 135 to closely contact the reference assembly surfaces SPs. The protrusions 131 are formed of an elastic material capable of providing an appropriate elastic pressure. For example, the protrusions 131 may be formed of injection molded plastic integrally with the lens support plate 130. For example, since the protrusions 131 provide a pressure corresponding to a compression level and an elastic strength when the magnet 135 is assembled, a protruding thickness t1 of and a material for forming the protrusions 131 may be appropriately designed. If the elastic strength of the protrusions 131 is excessive, the magnet 135 may not be easily assembled. On the other hand, if the elastic strength of the protrusions 131 is not sufficient, the magnet 135 may not be easily fixed.

The protrusions 131 are required to be elastically biased in a compression direction and to continuously provide a uniform elastic force to the magnet 135, and thus may be formed of a material having a high fatigue resistance. Meanwhile, the protrusions 131 provided on the tight fit surfaces TFPs may be formed in an angular shape such as a triangular shape or a rectangular shape as well as a circular shape of a hemisphere.

Figure 5:
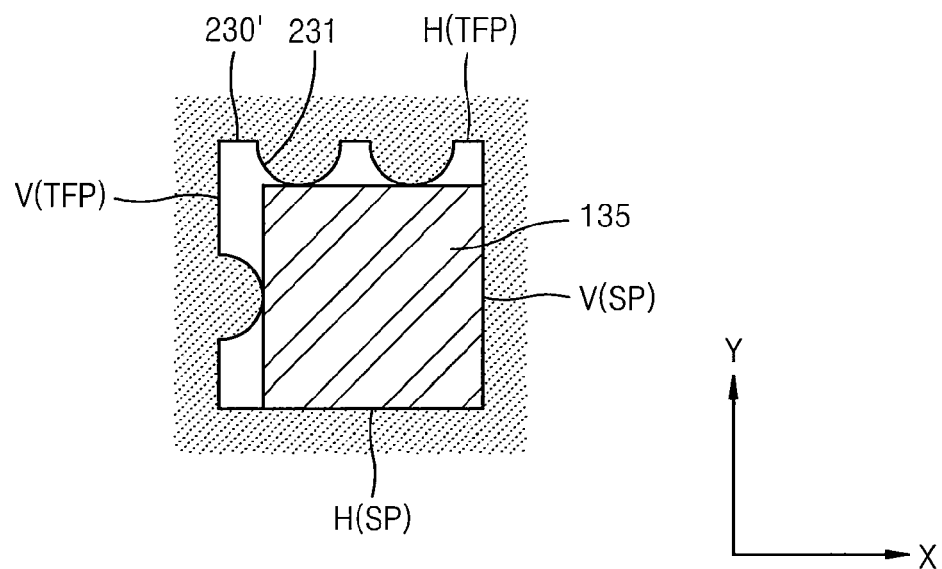
FIG. 5 is a plan view of an assembly groove for a magnet, according to another embodiment of the present invention.

FIG. 5 is a plan view of an assembly groove 230' for a magnet 135, according to another embodiment of the present invention.

Referring to FIG. 5, the assembly groove 230' is defined by two flat reference assembly surfaces SPs and two tight fit surfaces TFPs on which protrusions 231 are formed. As illustrated in FIG. 5, one of two horizontal walls H and one of two vertical walls V function as tight fit surfaces TFPs on which the protrusions 231 are formed and the other one of the horizontal walls H and the one of the vertical walls V function as the flat reference assembly surfaces SPs. In this case, one or more protrusions 231 may be formed on each of the tight fit surfaces TFPs and the number of the protrusions 231 is not limited to as illustrated in FIG. 5.

Figure 6:
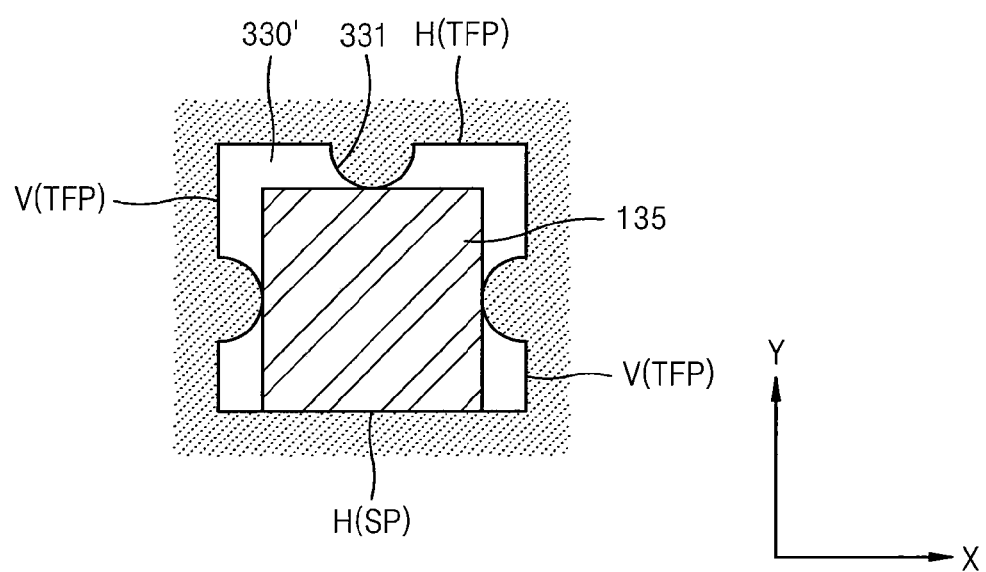
FIG. 6 is a plan view of an assembly groove for a magnet, according to another embodiment of the present invention.

FIG. 6 is a plan view of an assembly groove 330' for a magnet 135, according to another embodiment of the present invention.

Referring to FIG. 6, the assembly groove 330' is defined by one flat reference assembly surface SP and three tight fit surfaces TFPs on which protrusions 331 are formed. As illustrated in FIG. 6, one of two horizontal walls H functions as the flat reference assembly surface SP, and the other one of the horizontal walls H and two vertical walls V function as the tight fit surfaces TFPs on which the protrusions 331 are formed. In this case, one or more protrusions 231 may be formed on each of the tight fit surfaces TFPs and the number of the protrusions 231 is not limited to that illustrated in FIG. 5.

Since the reference assembly surface SP stably supports the entire surface of the magnet 135 in the Y axis direction, the magnet 135 may be firmly fixed in the Y axis direction. The protrusions 331 formed on the tight fit surfaces TFPs provide an elastic pressure to make the magnet 135 closely contact the reference assembly surface SP or provide an elastic pressure in the X axis direction to fix the magnet 135.

Figure 7:
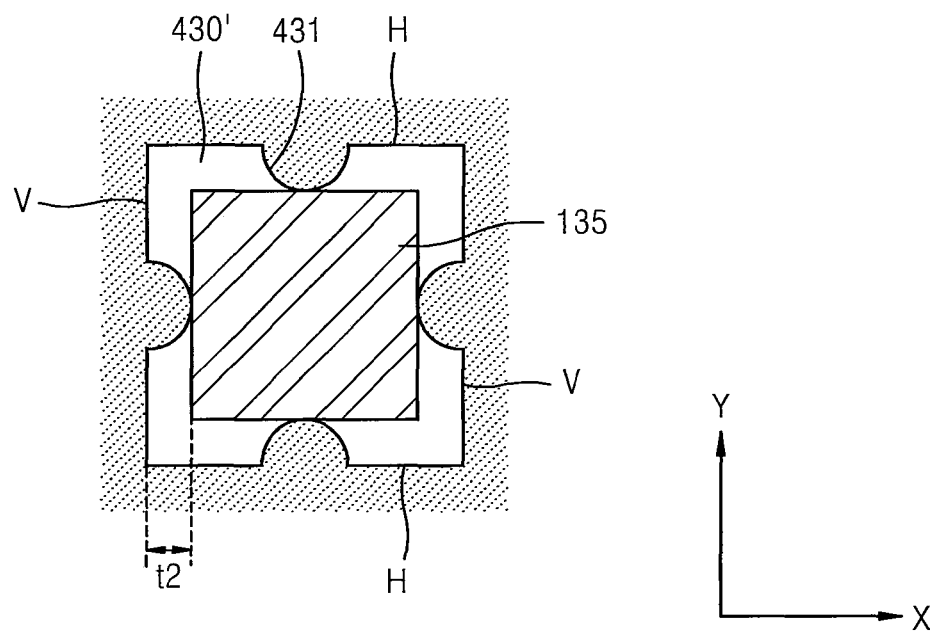
FIG. 7 is a plan view of an assembly groove for a magnet, according to another embodiment of the present invention.

FIG. 7 is a plan view of an assembly groove 430' for a magnet 135, according to another embodiment of the present invention.

Referring to FIG. 7, protrusions 431 are formed on all internal walls (two horizontal walls H and two vertical walls V) of the assembly groove 430', which surround the magnet 135. As the magnet 135 fitted in the assembly groove 430' is elastically pressed from four directions, the magnet 135 is tightly fixed.

In this case, by differently designing the protrusions 431, some of the internal walls may be designated as reference assembly surfaces SPs and the others of the internal walls may be designated as tight fit surfaces TFPs. For example, the protrusions 431 may have different compression characteristics by designing the protrusions 431 to have different protruding thicknesses t2 or by designing some of the protrusions 431 to have a hollow shape. In this case, non-easily deformable protrusions 431 may function as the reference assembly surfaces SPs and easily deformable protrusions 431 may function as the tight fit surfaces TFPs.

Figure 8:
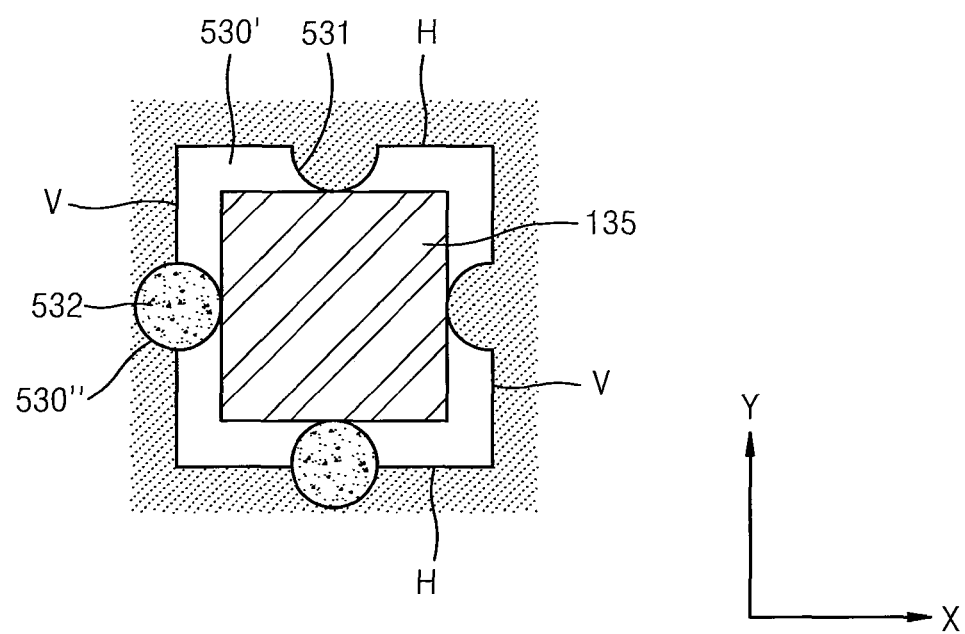
FIG. 8 is a plan view of an assembly groove for a magnet, according to another embodiment of the present invention.

FIG. 8 is a plan view of an assembly groove 530' for a magnet 135, according to another embodiment of the present invention.

Referring to FIG. 8, additional elastic members 532 are interposed between the magnet 135 and internal walls of the assembly groove 530'. The elastic members 532 fix the magnet 135 by providing an elastic pressure to corresponding surfaces of the magnet 135. For example, the elastic members 532 may stably fix the magnet 135 in a two-dimensional X-Y plane by pressing the magnet 135 in the X and Y axis directions. For this, concave grooves 530" that match the elastic members 532 may be formed on horizontal and vertical walls H and V of the assembly groove 530' and the elastic members 532 may be disposed in the concave grooves 530". For example, the elastic members 532 may be formed in a rod shape having a circular cross-section. Meanwhile, protrusions 531 that may be integrally formed with the internal walls of the assembly groove 530' may face the elastic members 532.

Structures of an assembly groove for a yoke will now be described with reference to FIGS. 9 through 13.

Figure 9:
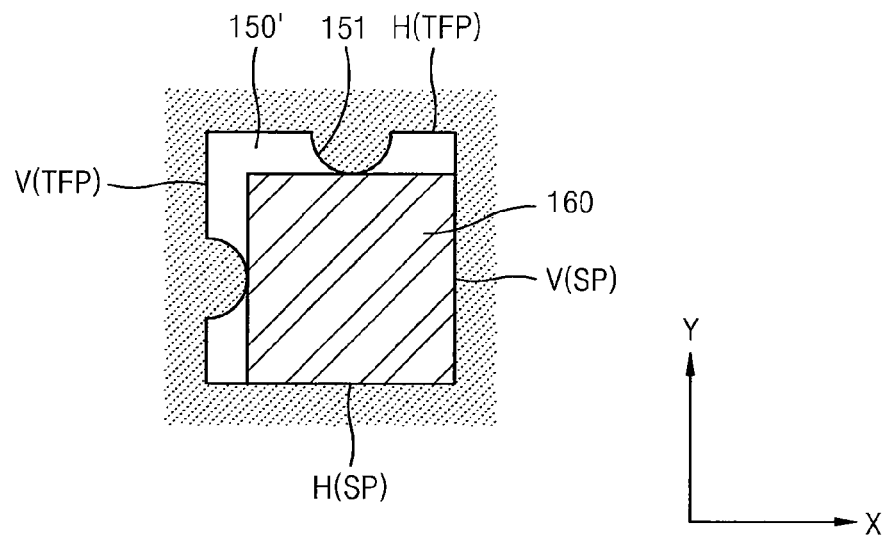
FIG. 9 is a plan view of an assembly groove for a yoke, according to an embodiment of the present invention.

FIG. 9 is a plan view of an assembly groove 150' for a yoke 160, according to an embodiment of the present invention.

Referring to FIG. 9, the assembly groove 150' includes protrusions 151 that protrude from internal walls (two horizontal walls H and two vertical walls V) toward the yoke 160 and elastically press the yoke 160. As illustrated in FIG. 9, one of the horizontal walls H and one of the vertical walls V function as tight fit surfaces TFPs on which the protrusions 151 are formed and the other one of the horizontal walls H and the one of the vertical walls V function as flat reference assembly surfaces SPs. The two reference assembly surfaces SPs stably support two entire surfaces of the yoke 160 in the X and Y axis directions and thus the yoke 160 may be firmly fixed in a two-dimensional X-Y plane. The protrusions 151 formed on the tight fit surfaces TFPs are disposed to face the reference assembly surfaces SPs and provide an elastic pressure to make the yoke 160 closely contact the reference assembly surfaces SPs in the X and Y axis directions. Meanwhile, technical features of the protrusions 151 are substantially identical to the technical feathers of the protrusions 131 illustrated in FIG. 4 and thus a detailed description thereof will be omitted here.

Figure 10:
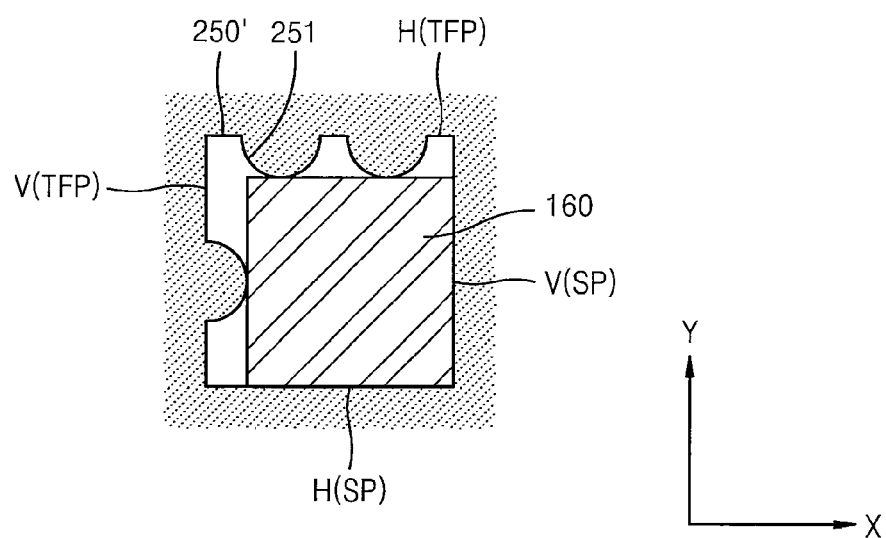
FIG. 10 is a plan view of an assembly groove for a yoke, according to another embodiment of the present invention.

FIG. 10 is a plan view of an assembly groove 250' for a yoke 160, according to another embodiment of the present invention.

Referring to FIG. 10, the assembly groove 250' is defined by two flat reference assembly surfaces SPs and two tight fit surfaces TFPs on which protrusions 251 are formed. As illustrated in FIG. 10, one or more protrusions 251 may be formed on each of the tight fit surfaces TFPs and the number of the protrusions 251 is not limited to as illustrated in FIG. 10.

Figure 11:
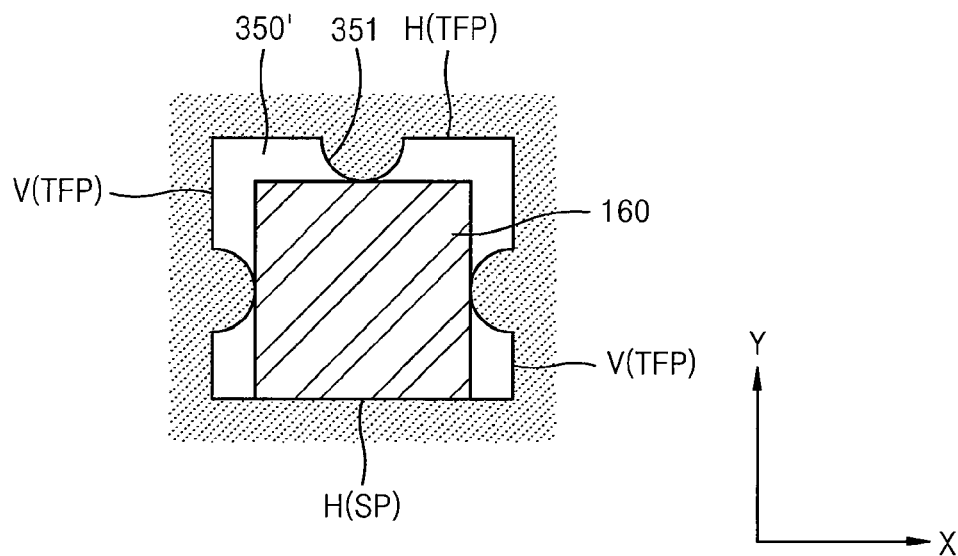
FIG. 11 is a plan view of an assembly groove for a yoke, according to another embodiment of the present invention.

FIG. 11 is a plan view of an assembly groove 350' for a yoke 160, according to another embodiment of the present invention.

Referring to FIG. 11, the assembly groove 350' is defined by one flat reference assembly surface SP and three tight fit surfaces TFPs on which protrusions 351 are formed. As illustrated in FIG. 11, one of two horizontal walls H functions as the flat reference assembly surface SP, and the other one of the horizontal walls H and two vertical walls V function as the tight fit surfaces TFPs on which the protrusions 351 are formed. Since the reference assembly surface SP stably supports a whole surface of the yoke 160 in the Y axis direction, the yoke 160 may be firmly fixed in the Y axis direction. The protrusions 351 formed on the tight fit surfaces TFPs provide an elastic pressure to make the yoke 160 closely contact the reference assembly surface SP or provide an elastic pressure in the X axis direction to fix the yoke 160.

Figure 12:
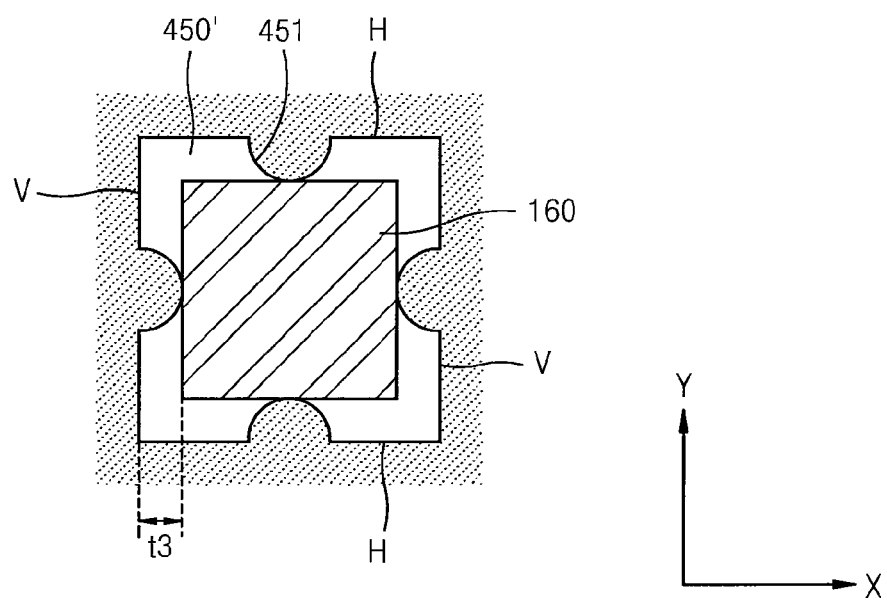
FIG. 12 is a plan view of an assembly groove for a yoke, according to another embodiment of the present invention.

FIG. 12 is a plan view of an assembly groove 450' for a yoke 160, according to another embodiment of the present invention.

Referring to FIG. 12, protrusions 451 are formed on all internal walls (two horizontal walls H and two vertical walls V) of the assembly groove 450', which surround the yoke 160. As the yoke 160 fitted in the assembly groove 450' is elastically pressed from four directions, the yoke 160 is tightly fixed. In this case, some of the internal walls may be designated as reference assembly surfaces SPs and the others of the internal walls may be designated as tight fit surfaces TFPs, by differently designing the protrusions 451. For example, the protrusions 451 may have different compression characteristics by designing the protrusions 451 to have different protruding thicknesses t3 or by designing some of the protrusions 451 to have a hollow shape. In this case, non-easily deformable protrusions 451 may function as the reference assembly surfaces SPs and easily deformable protrusions 451 may function as the tight fit surfaces TFPs.

Figure 13:
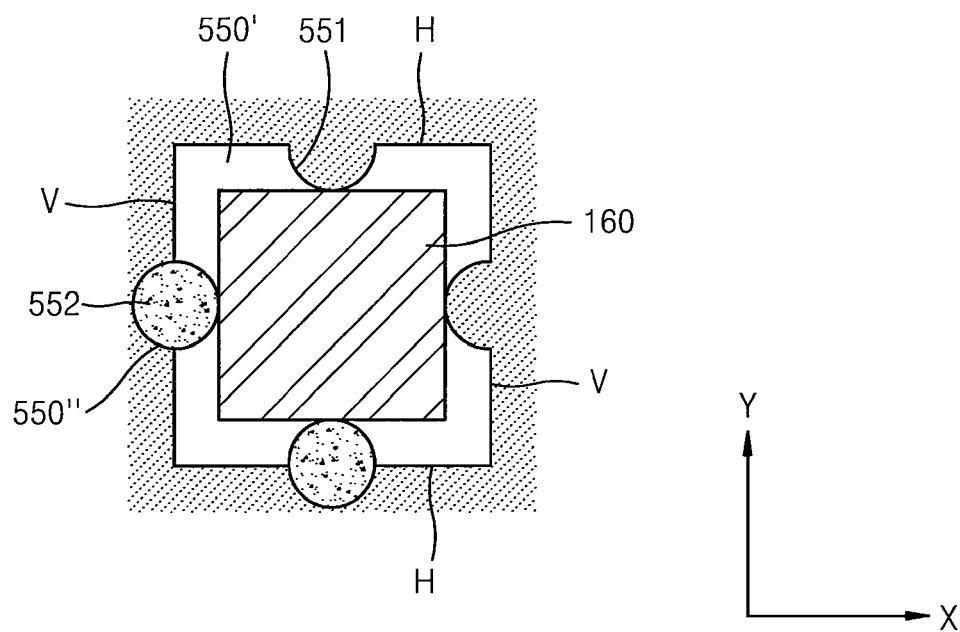
FIG. 13 is a plan view of an assembly groove for a yoke, according to another embodiment of the present invention.

FIG. 13 is a plan view of an assembly groove 550' for a yoke 160, according to another embodiment of the present invention.

Referring to FIG. 13, additional elastic members 552 are interposed between the yoke 160 and internal walls of the assembly groove 550'. The elastic members 552 fix the yoke 160 by providing an elastic pressure to corresponding surfaces of the yoke 160. For example, the elastic members 552 may stably fix the yoke 160 in a two-dimensional X-Y plane by pressing the yoke 160 in the X and Y axis directions. For this, concave grooves 550" that match the elastic members 552 may be formed on horizontal and vertical walls H and V of the assembly groove 550' and the elastic members 552 may be disposed in the concave grooves 550". For example, the elastic members 552 may be formed in a rod shape having a circular cross-section. Meanwhile, protrusions 551 that may be integrally formed with the internal walls may face the elastic members 552.

Meanwhile, the handshake correction apparatus 100 illustrated in FIG. 1 may be disposed in a camera having a barrel structure. The barrel structure may be a retractable barrel structure in which a barrel assembly is moved into/from the camera according to an on/off state of the camera, or a inner zoom barrel structure having an optical system that is vertically arranged based on an incident direction of light reflected from a subject.

As described above, according to the present invention, assembly parts including magnets and yokes may be prevented from being arbitrary dislocated from their positions and may be fixed at their positions with high precision, by improving assembly structures of the assembly parts. As such, a non-linear characteristic between driving input and output, which is caused by misalignment, may be removed and a uniform correction performance may be ensured regardless of a driving direction, by ensuring alignment between the magnets and the yokes, and between the magnets, the yokes, and driving coils for electromagnetic interaction.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of components configured to perform the specified functions.

The particular implementations shown and described herein are illustrative examples of the invention and are not intended to otherwise limit the scope of the invention in any way. For the sake of brevity, conventional electronics, and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context.

Numerous modifications and adaptations will be readily apparent to those skilled in this art without departing from the spirit and scope of the present invention.

What is claimed is:

1. A handshake correction apparatus comprising:
    a lens support plate that supports a correction lens and operates in a direction perpendicular to an optical axis;
    a base that supports movement of the lens support plate; and
    one or more magnets and driving coils (yokes) which are assembled on the lens support plate and the base to face each other;
    wherein the magnets are tight-fitted in assembly grooves of the lens support plate or the base, the assembly grooves are surrounded in a plane by the lens support plate,
    wherein one or more protrusions that protrude from internal walls of the assembly grooves toward the magnets and elastically press the magnets to fix positions of the magnets relative to the assembly grooves are formed in the assembly grooves, and
    wherein the one or more protrusions are formed on at least one of the internal walls of the assembly grooves, which surround the magnets.

2. The apparatus of claim 1, wherein the internal walls of the assembly grooves, which face the one or more protrusions, function as flat reference surfaces.

3. The apparatus of claim 1, wherein the one or more protrusions are formed on the internal walls that face the magnets in different directions.

4. The apparatus of claim 1, wherein the assembly grooves have a rectangular shape defined by two horizontal walls and two vertical walls, which are separately parallel to each other,
    wherein the one or more protrusions are formed on one of the horizontal walls and one of the vertical walls, and
    wherein the other one of the horizontal walls and the other one of the vertical walls function as flat reference surfaces.

5. The apparatus of claim 1, wherein the one or more protrusions comprise:
    one or more first protrusions that are relatively easy to be elastically deformed; and
    one or more second protrusions that are relatively difficult to be elastically deformed.

6. The apparatus of claim 5, wherein the one or more first protrusions are formed to have a hollow shape.

7. The apparatus of claim 1, wherein the one or more protrusions comprise:
    one or more first protrusions that have a relatively small protruding thickness toward the magnets; and
    one or more second protrusions that have a relatively large protruding thickness toward the magnets.

8. The apparatus of claim 1, wherein the one or more protrusions are integrally formed with the internal walls of the assembly grooves.

9. The apparatus of claim 1, wherein the one or more protrusions comprise elastic members interposed between the magnets and the internal walls of the assembly grooves.

10. A handshake correction apparatus comprising:
    a lens support plate that supports a correction lens and operates in a direction perpendicular to an optical axis;
    a base that supports movement of the lens support plate;
    one or more magnets and driving coils (yokes) which are assembled on the lens support plate and the base to face each other;
    wherein the yokes are tight-fitted in assembly grooves of the lens support plate or the base, the assembly grooves are surrounded in a plane by the lens support plate,
    wherein one or more protrusions that protrude from internal walls of the assembly grooves toward the yokes and elastically press the yokes to fix positions of the yokes relative to the assembly grooves are formed in the assembly grooves, and
    wherein the one or more protrusions are formed on at least one of the internal walls of the assembly grooves, which surround the yokes.

11. The apparatus of claim 10, wherein the internal walls of the assembly grooves, which face the one or more protrusions, function as flat reference surfaces.

12. The apparatus of claim 10, wherein the one or more protrusions are formed on the internal walls that face the yokes in different directions.

13. The apparatus of claim 10, wherein the assembly grooves have a rectangular shape defined by two horizontal walls and two vertical walls, which are separately parallel to each other,
    wherein the one or more protrusions are formed on one of the horizontal walls and one of the vertical walls, and
    wherein the other one of the horizontal walls and the other one of the vertical walls function as flat reference surfaces.

14. The apparatus of claim 10, wherein the one or more protrusions comprise:
    one or more first protrusions that are relatively easy to be elastically deformed; and
    one or more second protrusions that are relatively difficult to be elastically deformed.

15. The apparatus of claim 14, wherein the one or more first protrusions are formed to have a hollow shape.

16. The apparatus of claim 10, wherein the one or more protrusions comprise:
    one or more first protrusions that have a relatively small protruding thickness toward the yokes; and
    one or more second protrusions that have a relatively large protruding thickness toward the yokes.

17. The apparatus of claim 10, wherein the one or more protrusions are integrally formed with the internal walls of the assembly grooves.

18. The apparatus of claim 10, wherein the one or more protrusions comprise elastic members interposed between the yokes and the internal walls of the assembly grooves.

* * * * *